US005721682A

United States Patent [19]

Arai et al.

[11] Patent Number: 5,721,682
[45] Date of Patent: Feb. 24, 1998

[54] SYSTEM FOR DISCRIMINATING OPERATING STATE OF VEHICLE CLUTCH MECHANISM

[75] Inventors: Takashi Arai; Atsushi Abe; Koichi Funatsu; Tadashi Yamatani, all of Wako, Japan

[73] Assignee: Honda Giken Kogyo Kabushiki Kaisha, Tokyo, Japan

[21] Appl. No.: 548,623

[22] Filed: Oct. 26, 1995

[30] Foreign Application Priority Data

Oct. 31, 1994 [JP] Japan .................... 6-290634

[51] Int. Cl.$^6$ .................... G06G 7/70; B60K 41/02; F16D 33/00
[52] U.S. Cl. .................... 364/424.096; 364/424.097; 364/424.034; 477/176; 477/906; 192/3.3; 192/3.31; 192/103 R; 74/336 R
[58] Field of Search .................... 364/424.091, 424.092, 364/424.093, 424.096, 424.097, 424.083, 424.085, 423.098, 424.034, 424.039, 424.08; 477/115, 97, 906, 117, 94, 65, 125, 72, 76, 86, 175, 176, 907; 74/336 R, 731.1, 335; 192/3.3, 82 T, 103 R, 3.31, 3.63

[56] References Cited

U.S. PATENT DOCUMENTS

| | | | |
|---|---|---|---|
| 4,729,461 | 3/1988 | Nishikawa et al. | 192/3.31 |
| 4,926,328 | 5/1990 | Funatsu et al. | 364/424.085 |
| 4,953,679 | 9/1990 | Okino | 192/3.3 |
| 4,989,702 | 2/1991 | Yoshimura et al. | 192/3.31 |
| 5,029,087 | 7/1991 | Conan et al. | 364/424.097 |
| 5,105,926 | 4/1992 | Yoshimura et al. | 192/3.3 |
| 5,128,868 | 7/1992 | Imai et al. | 364/424.08 |
| 5,283,738 | 2/1994 | Schwab et al. | 364/424.097 |
| 5,335,174 | 8/1994 | Kohno et al. | 364/424.097 |
| 5,367,854 | 11/1994 | Creger et al. | 477/155 |
| 5,403,249 | 4/1995 | Slicker | 477/176 |
| 5,439,428 | 8/1995 | Slicker | 364/424.097 |
| 5,599,254 | 2/1997 | Tomisawa et al. | 477/176 |
| 5,609,067 | 3/1997 | Mitchell et al. | 74/336 R |
| 5,613,583 | 3/1997 | Kono et al. | 192/3.31 |

*Primary Examiner*—Jacques Louis-Jacques
*Attorney, Agent, or Firm*—Armstrong, Westerman, Hattori, McLeland & Naughton

[57] ABSTRACT

A system for discriminating operation state of a lockup clutch of a torque converter of a transmission of a vehicle, more particularly to a system for detection a lockup clutch failure. In the system, three discrimination areas are preestablished with respect to the throttle opening and vehicle speed and reference value are determined in response to a selected discrimination area. The converter slip ratio is compared with the data and when the ratio is out of a range determined by the data, the lockup clutch operation is discriminated to be not normal. At that time, however, when the area is in a weak-engaged region, the engaging force is forcibly increased and the discrimination is conducted once again, thereby making it possible to conduct failure detection in the slip-engaged region and enhancing detection accuracy.

11 Claims, 8 Drawing Sheets

SYSTEM FOR DISCRIMINATING OPERATING STATE OF VEHICLE CLUTCH MECHANISM

BACKGROUND OF THE INVENTION

1. Field of the Invention

This invention relates to a system for discriminating the operating state of a vehicle clutch mechanism, particularly to a system for discriminating the operating state of a lockup of a torque, converter of a vehicle automatic transmission, more particularly to a system for detecting a lockup clutch failure or trouble in the torque converter of a vehicle automatic transmission.

2. Description of the Prior Art

In vehicle automatic transmissions, power from the engine is generally transmitted to the transmission gear unit through a torque converter. The torque converter is equipped with a lockup clutch which is turned ON/OFF during operating conditions that lower torque converter efficiency. The engagement force of the lockup clutch is appropriately controlled based on the vehicle running conditions such as degree of throttle opening, the vehicle speed and the like. Failure of the converter lockup clutch lowers fuel economy and may degrade drivability owing to the occurrence of vibration caused by improper adjustment of the engagement force.

It is therefore desirable to detect converter lockup clutch failure or trouble. As taught by Japanese Laid-Open Patent Application No. Hei 2(1990)-176,265, this detection can be conducted by comparing the rotational speed on the input and output sides of the lockup clutch (the engine rotational speed and the transmission input rotational speed) when a lockup clutch ON command is in effect and determining that lockup clutch failure has occurred when the difference between the speeds falls outside a prescribed reference range.

However, this prior art technology is unable to detect converter lockup clutch failure when the converter lockup clutch is being slip-controlled and is also insufficient in detection capability owing to the broad reference range it defines as normal in order to prevent erroneous detection when a complete locked-up or fully-engaged command is in effect.

An object of this invention is therefore to overcome the aforesaid problems by providing a system for determining the operating state of a vehicle clutch mechanism, particularly to a system for determining the operating state of a lockup of a torque converter of a vehicle automatic transmission, more particularly to a system for detecting a lockup clutch failure or trouble in the torque converter of a vehicle automatic transmission, which has improved failure detection capability.

SUMMARY OF THE INVENTION

This invention achieves this object by providing a system for determining operating state of a clutch mechanism of a vehicle that couples an output of an internal combustion engine mounted on the vehicle and an input of a transmission connected to the engine, comprising, input rotational speed detecting means for detecting a rotational speed of a shaft input to the clutch mechanism, output rotational speed detecting means for detecting a rotational speed of a shaft output from the clutch mechanism, engaging force command generating means for generating an engaging force command to be applied to the clutch mechanism such that the clutch mechanism is in one of a plurality of engaged conditions ranging from a fully-engaged condition to a disengaged condition including a slip-engaged condition and clutch mechanism operation determining means for determining whether the clutch mechanism operation is normal, by comparing the rotational speeds detected by said input and output rotational speed detecting means with a reference value indicative of the engaging force command, and for outputting the result of the determination. In the system the clutch mechanism operation determining means includes reference level changing means for changing the reference value in response to the output of the clutch mechanism operation determining means.

BRIEF EXPLANATION OF THE DRAWINGS

This and other objects and advantages of the invention will be more apparent from the following description and drawings, in which.

DETAILED DESCRIPTION OF THE PREFERRED EMBODIMENT

An embodiment of the invention will now be explained with reference to the attached drawings.

Figure 1:
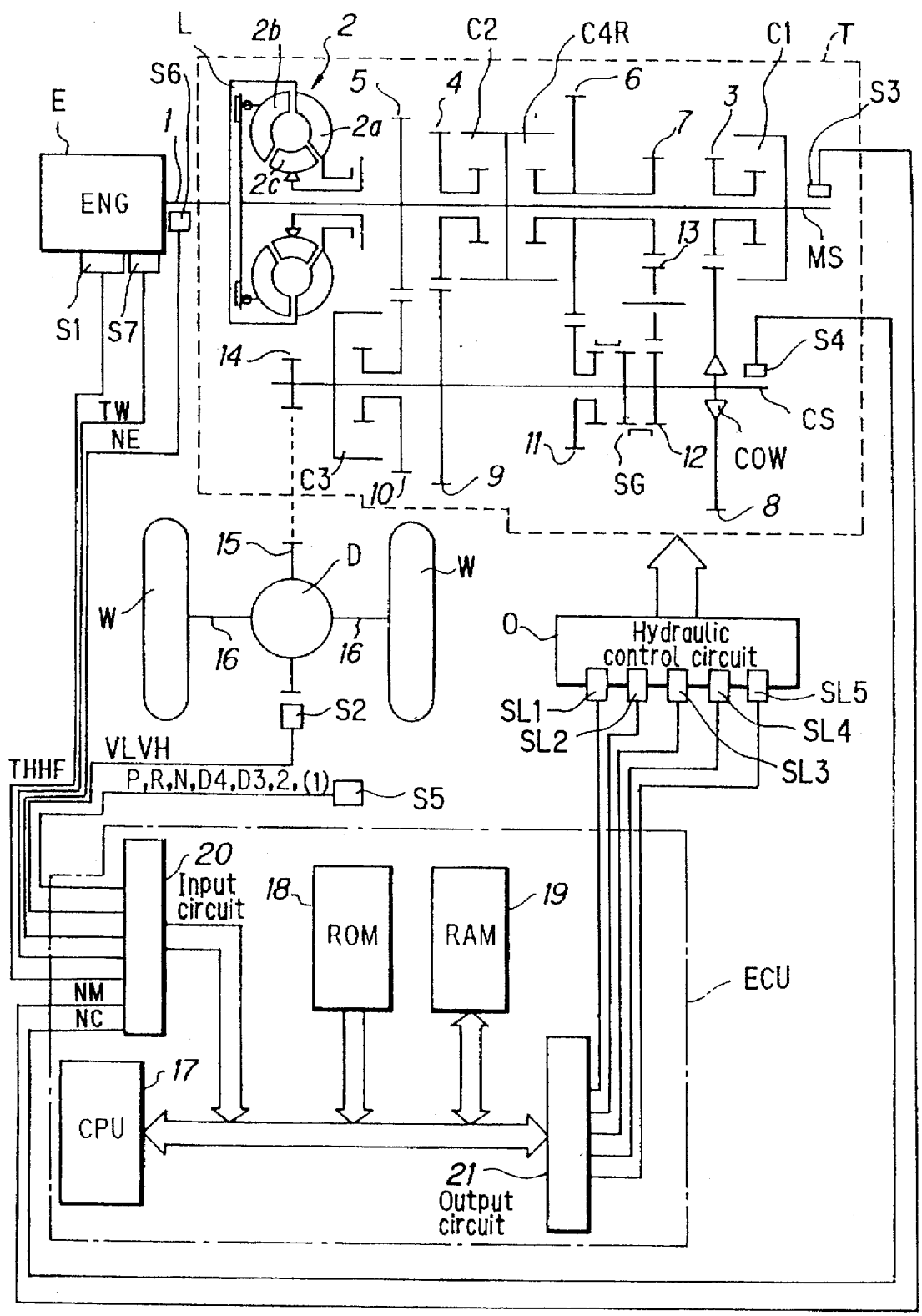
FIG. 1 is an overall schematic view showing the configuration of a system for determining the operating state of a vehicle clutch mechanism according to the present invention.

FIG. 1 is an overall view of the system for determining the operating state of a vehicle clutch mechanism according to the invention taking as an example a hydraulic or fluid coupling such as torque converter with lockup clutch used in a vehicle automatic transmission.

As shown in FIG. 1, a vehicle automatic transmission T is equipped with a main shaft MS connected with a crankshaft 1 of an internal combustion engine E through a torque converter 2 having a lockup clutch L and with a countershaft CS connected with the main shaft MS through multiple gear trains.

The main shaft MS supports a main first-speed gear 3, a main second-speed gear 4, a main third-speed gear 5, a main fourth-speed gear 6 and a main reverse gear 7. The countershaft CS supports a counter first-speed gear 8 engaged with the main first-speed gear 3, a counter second-speed gear 9 engaged with the main second-speed gear 4, a counter third-speed gear 10 engaged with the main third-speed gear 5, a counter fourth-speed gear 11 engaged with the main fourth-speed gear 6 and a counter reverse gear 12 engaged with the main reverse gear 7 through a reverse idle gear 13.

The first gear is established when the main first-speed gear 3 rotatably supported on the main shaft MS is connected with the main shaft MS by a first-speed hydraulic clutch C1. Since the first-speed hydraulic clutch C1 is also maintained in the engaged state during establishment of the second-fourth gears, the counter first-speed gear 8 is supported by a one-way clutch COW. The second gear is established when the main second-speed gear 4 rotatably supported on the main shaft MS is connected with the main shaft MS by a second-speed hydraulic clutch C2. The third gear is established when the counter third-speed gear 10 rotatably supported on the countershaft CS is connected with the countershaft CS by a third-speed hydraulic clutch C3.

The fourth gear is established when the counter fourth-speed gear 11 rotatably supported on the countershaft CS is connected with the countershaft CS by a selector gear SG and with this state maintained the main fourth-speed gear 6 rotatably supported on the main shaft MS is connected with the main shaft MS by a fourth-speed reverse hydraulic clutch C4R. The reverse gear is established when the counter reverse gear 12 rotatably supported on the countershaft CS is connected with the countershaft CS by the selector gear SG and with this state maintained the main reverse gear 7 rotatably supported on the main shaft MS is connected with the main shaft MS by the fourth-speed reverse hydraulic clutch C4R.

The rotation of the countershaft CS is transmitted through a final drive gear 14 and a final driven gear 15 to a differential D, from where it is transmitted to driven wheels W, W through left and right drive shafts 16, 16.

A throttle position sensor S1 is provided in an air intake pipe (not shown) of the engine E at a point in the vicinity of a throttle valve (not shown) for detecting the degree of opening or position THHF of the throttle valve. A vehicle speed sensor S2 for detecting the vehicle traveling speed VLVH from the rotational speed of the final driven gear 15 is provided in the vicinity of the final driven gear 15. A transmission input shaft speed sensor S3 is provided in the vicinity of the main shaft MS for detecting the rotational speed NM of the transmission input shaft from the rotation of the main shaft MS, and a transmission output shaft speed sensor S4 is provided in the vicinity of the countershaft CS for detecting the rotational speed Nc of the transmission output shaft from the rotation of the countershaft CS.

A shift lever position sensor S5 is provided in the vicinity of a shift lever (not shown) installed on the vehicle floor near the driver's seat. The shift lever position sensor S5 detects which of the seven positions P, R, N, D4, D3, 2, (1) has been selected by the driver. A crank angle sensor S6 is provided in the vicinity of the crankshaft 1 of the engine E for detecting the engine speed NE from the rotation of the crankshaft 1, and a coolant temperature sensor S7 for detecting the engine coolant temperature TW is provided at an appropriate location on a cylinder block (not shown) of the engine E. Outputs of the sensors S1 etc. are sent to an ECU (electronic control unit).

The ECU is constituted as a microcomputer comprising a CPU (central processing unit) 17, a ROM (read-only memory) 18, a RAM (random access memory) 19, an input circuit 20 and an output circuit 21. The outputs of the sensors S1 etc. are input to the microcomputer through the input circuit 20. The CPU 17 of the microcomputer determines the gear (ratio) and energizes/deenergizes shift solenoids SL1, SL2 of a hydraulic control circuit 0 via the output circuit 21 so as to switch shift valves (not shown) and thereby engage/disengage the hydraulic clutches of prescribed gears. As will be explained later, it also controls the lockup clutch and detects lockup clutch failure.

Symbols SL3 and SL4 designate an ON/OFF control solenoid and a capacity control solenoid for the lockup clutch L of the torque converter 2. Symbol SL5 designates a linear solenoid for controlling clutch oil pressure.

The torque converter 2 comprises of a pump 2a, a turbine 2b, a stator 2c and the lockup clutch L. The lockup clutch L is of the known configuration comprising a lockup piston, a damper spring etc. Depending on the amount of oil pressure supplied to its left and right chambers, the lockup clutch assumes an ON state (fully-engaged or completely locked-up state; shown by solid lines in FIG. 2 discussed below), an OFF state (disengaged state; shown by phantom lines in FIG. 2) or a slip-controlled state in between these two states such that the torque converter 2 is slip-engaged.

When the lockup clutch, FIG. 1, is ON, the power of the engine E is transmitted to the main shaft MS through a drive plate, the torque converter and the lockup clutch L. When the lockup clutch is OFF, it is transmitted to the main shaft MS through the drive plate, the torque converter, the pump 2a and the turbine 2b.

Figure 2:
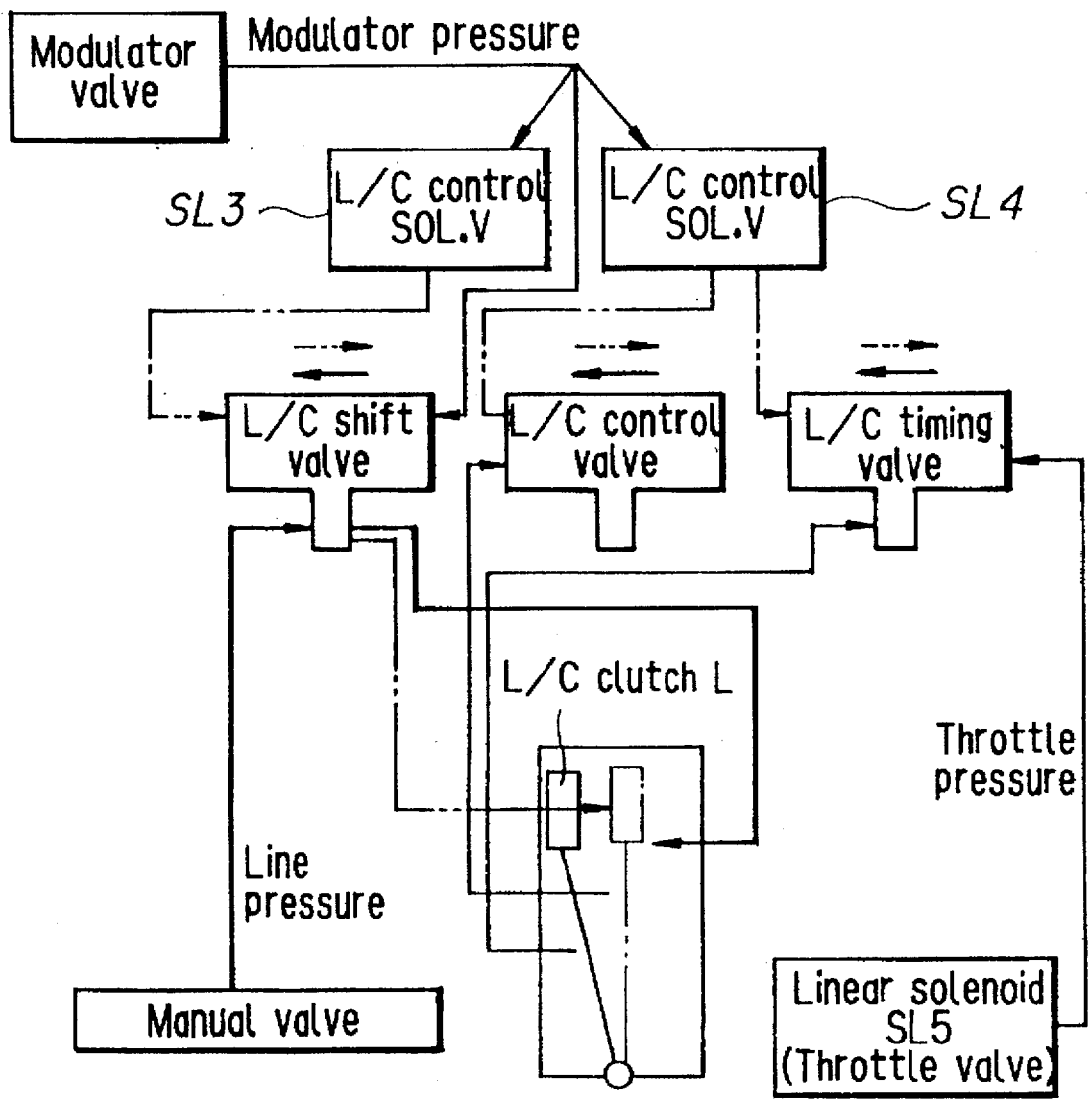
FIG. 2 is a block diagram showing a hydraulic control of a lockup clutch illustrated in FIG. 1.

FIG. 2 is a block diagram functionally illustrating the hydraulic control of the lockup clutch L. The lockup clutch is turned ON and OFF by supplying or not supplying line pressure from a manual valve to a lockup shift valve which receives modulator pressure from a modulator valve through the solenoid SL3. An L/C (lockup) control valve which receives the modulator pressure (through the solenoid SL4) controls the engaging force of the lockup clutch L by regulating the oil pressure supplied to the right chamber of the clutch.

The torque converter 2 is controlled to a completely locked-up (fully-engaged or ON) state by an L/C (lockup) timing valve which receives throttle pressure through the linear solenoid (throttle valve) SL5 and the modulator pressure (through the solenoid SL4). In FIG. 2, the completely locked-up state is indicated in solid lines and the OFF state in phantom lines.

Figure 3:
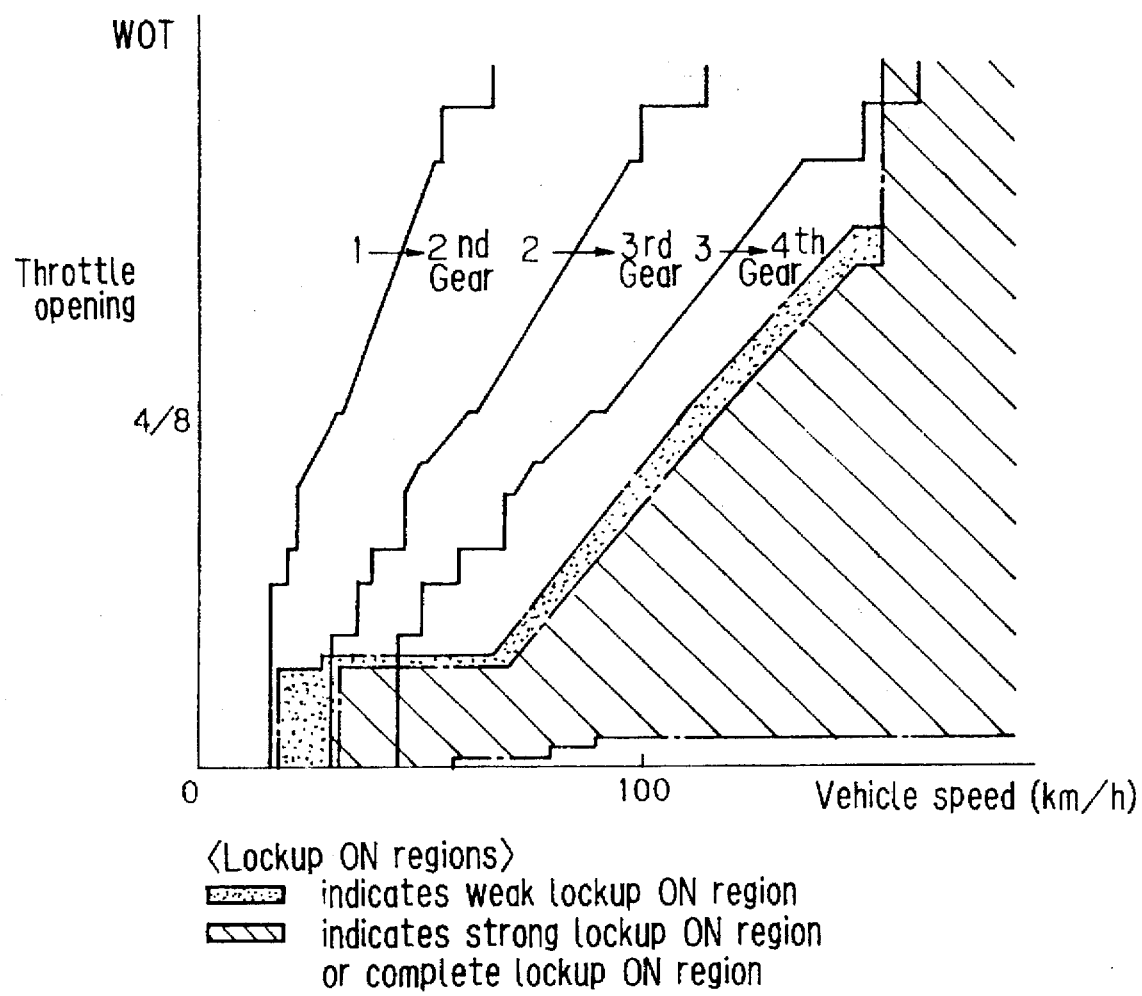
FIG. 3 is a graph showing the gear shift characteristics and the control characteristics of the lockup clutch illustrated in FIG. 1.

FIG. 3 shows the upshift lines of the gear shift characteristics (the downshift lines are not shown) and the lockup control characteristics. The engaging force of the lockup clutch L is PWM-controlled within the ON range of the lockup clutch L by the solenoid SL4, FIG. 2, based on the detected engine load such as throttle opening and vehicle speed so as to bring the torque converter slip ratio ETR to a desired value within the range from weak lockup to strong or complete lockup. Since the foregoing is well known and is not directly related to the gist of the invention, however, it will not be explained further here.

The operation of the system according to the invention will now be explained with reference to the flowcharts shown in FIG. 4 of the drawings.

Figure 4:
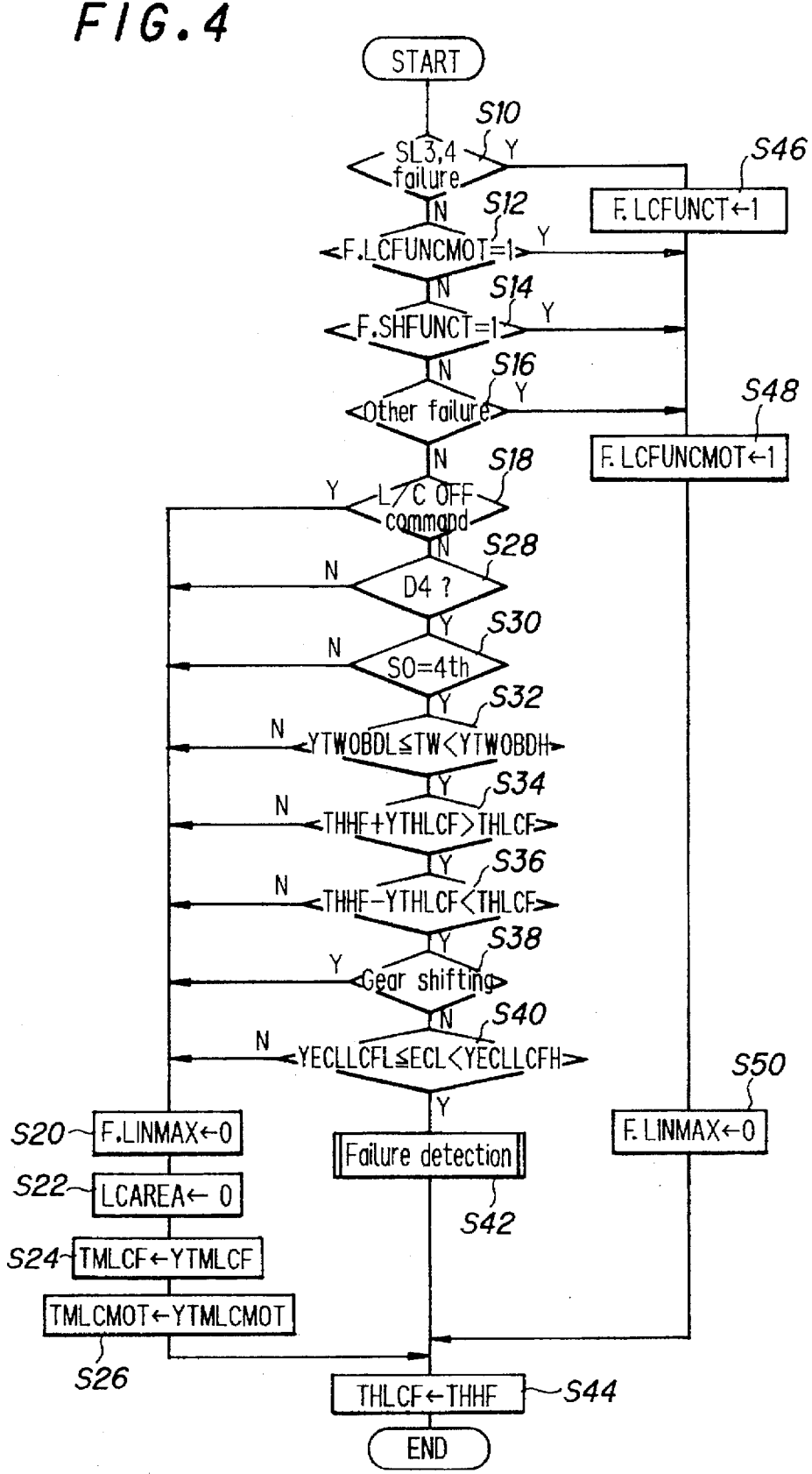
FIG. 4 is a flowchart showing the operation of the system according to the invention.

In FIG. 4, the program starts at S10 in which it is checked whether failure or the trouble of the solenoids SL3 and SL4 has been detected. This failure detection is conducted by another routine not shown and the determination in S10 is made by referring to an appropriate flag set in the routine.

When the result in S10 is NO, the program goes to S12 in which it is checked whether the bit of a flag F.LCFUNC-MOT (explained later; initially 0) is 1. The result in the first program loop (control cycle) is NO and the program goes to S14 in which it is checked whether the bit of a flag F.SHFUNCT is 1. The bit of this flag is set to 1 when failure of SL1, SL2 or one of the other solenoids is detected in a separate routine. Ordinarily the result in S14 is NO and the program goes to S16 in which it is checked whether any other failure has arisen in the lockup clutch system.

When the result in S16 is NO, the program proceeds to S18 in which it is checked whether a lockup OFF command is in effect. S18 through S40 are steps for discriminating whether or not the lockup failure detection conditions are established.

When the result in S18 is YES, since this means that a command to turn the lockup clutch OFF is in effect, it is concluded that the detection conditions are not established and the program goes to S20 in which the bit of a flag F.LINMAX (explained later) is reset to zero, to S22 in which the content of LCAREA (explained later) is set to 0, to S24 in which a timer TMLCF (explained later) is set to a prescribed value YTMLCF and to S26 in which a timer TMLCMOT (explained later) is set to a prescribed value YTMLCMOT.

When the result in S18 is NO, the program goes to S28 in which it is checked whether a D4 position signal is being received. If one is, the program goes to S30 in which it is checked whether the current gear S0 in a separate shift control routine is fourth gear. When it is, the program goes to S32 in which it is checked whether the detected coolant temperature TW is in the range of not less than a lower limit value YTWOBDL and less than an upper limit value YTWOBDH. This check is made because lockup control is not effected in high or low engine temperature states.

When the result in S32 is YES, the program goes to S34 in which a small value YTHLCF is added to the detected throttle opening THHF and the sum is compared with a value THLCF (that is the throttle opening THLCF in the preceding control cycle (program loop)). When S34 finds that the sum exceeds the throttle opening in the preceding loop (control cycle), the program goes to S36 in which the small value YTHLCF is subtracted from the detected throttle opening THHF and the difference is compared with the throttle opening THLCF in the preceding loop (control cycle). The procedures of S34 and S36 are for determining whether the detected throttle opening is stable.

When the result in S36 is YES, the program goes to S38 in which an appropriate flag of a separate routine is checked to determine whether gear shifting is in progress. When gear shifting is in progress, accurate failure detection is difficult owing to fluctuation in the speed of the main shaft MS and the program goes to S20. When gear shifting is not in progress, failure detection is possible and the program goes to S40 in which it is checked whether the clutch slip ratio ECL is in the range of not less than a lower limit value YECLLCFL and less than an upper limit value YECLLCFH.

These procedures are conducted to ensure utmost reliability, since a failure detection error may occur when gear shifting is not fully completed or the amount of slip in C2 or one of the other aforesaid hydraulic shift clutches exceeds a certain level. When the result in S40 is NO, the program goes to S20. When it is YES, the program goes to S42 in which failure detection (lockup clutch operating state discrimination) is conducted.

Figure 5:
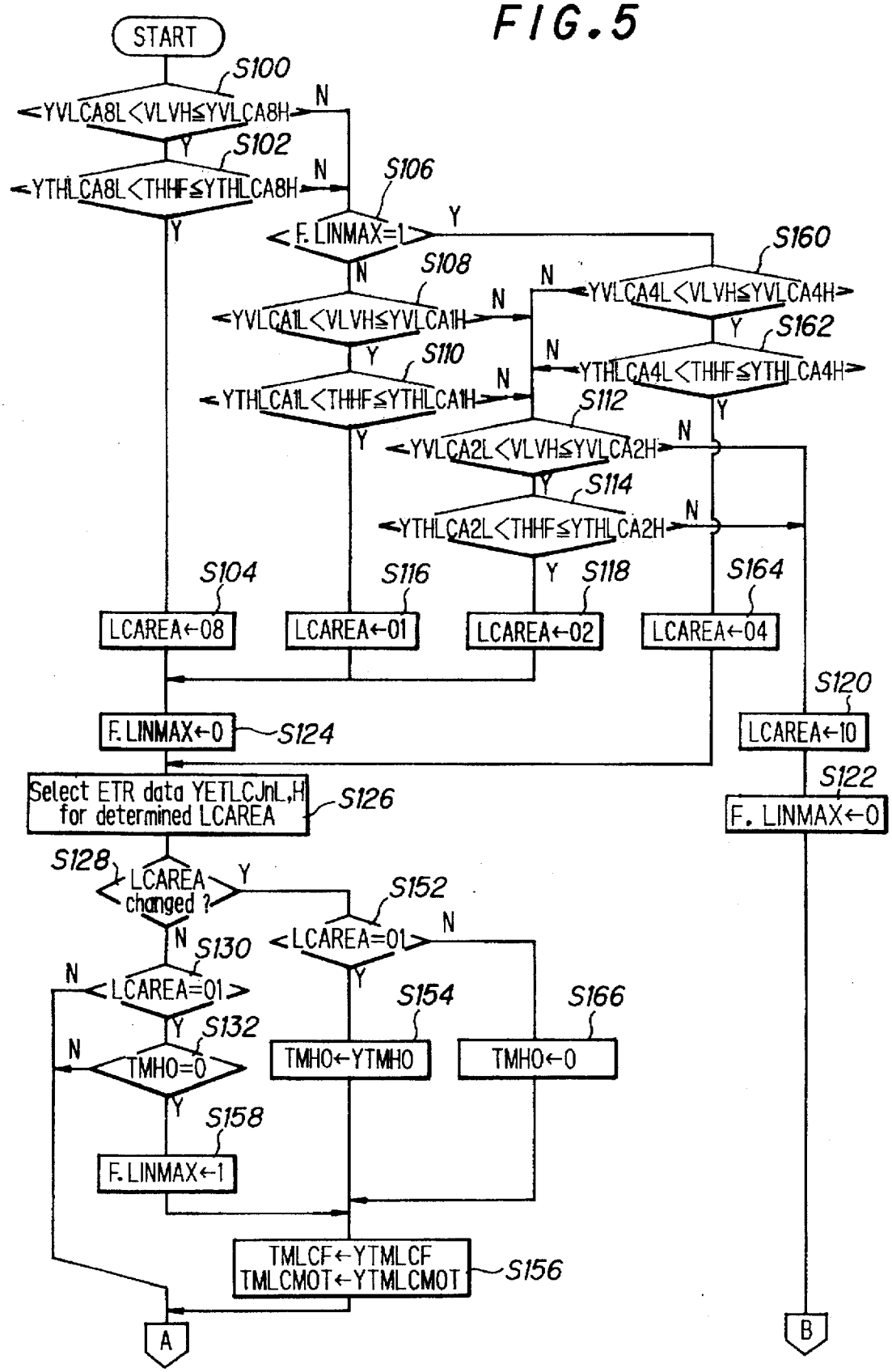
FIG. 5 is a upper half of a subroutine flowchart showing the details of failure detection referred to in FIG. 4.
Figure 6:
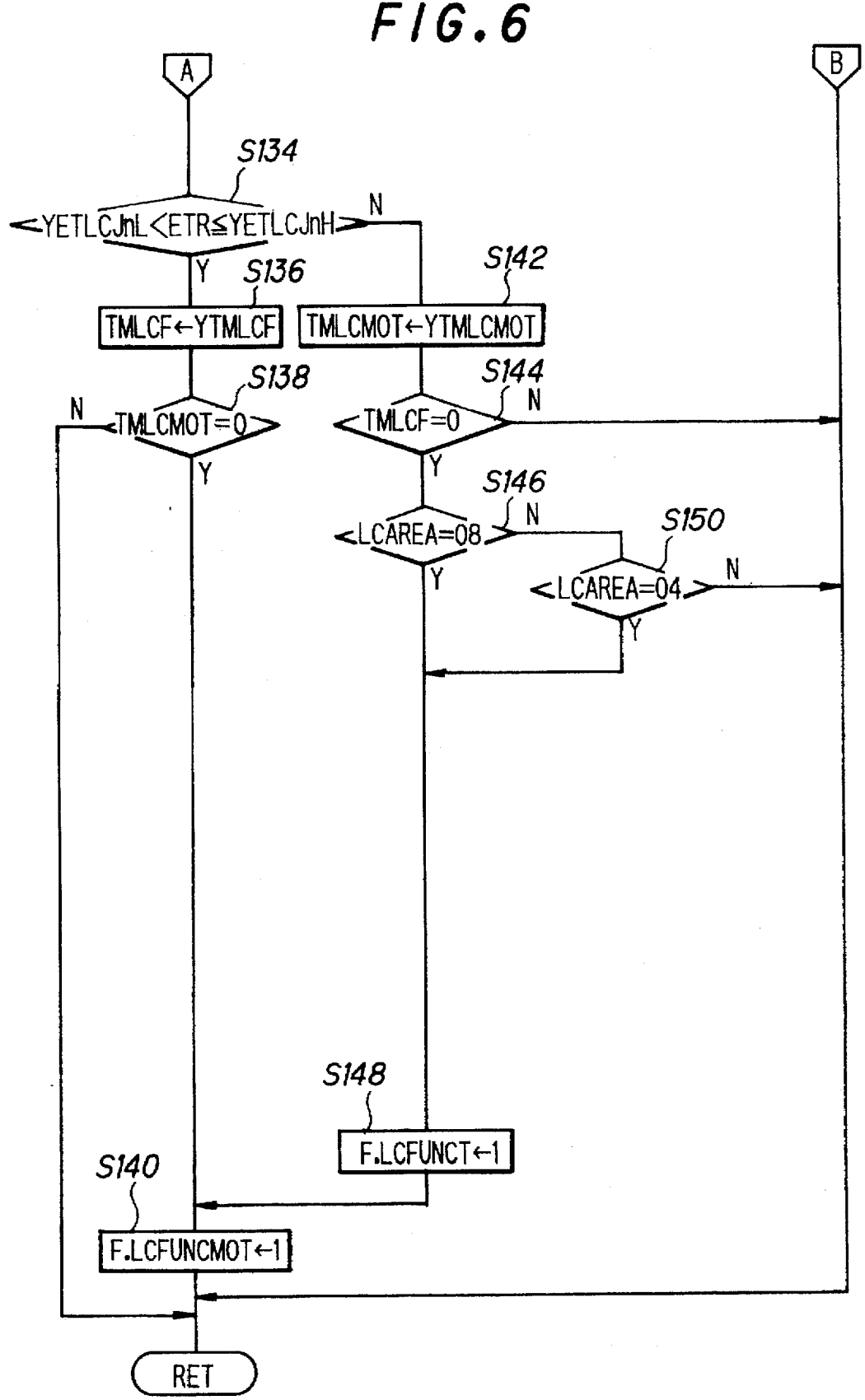
FIG. 6 is a bottom half of the subroutine flowchart of FIG. 5.

FIGS. 5 and 6 are flowcharts of subroutines for this detection. The explanation of these figures will, however, be preceded by a general explanation of the detection method according to the invention with reference to FIG. 7.

In the detection method of this invention, three basic discrimination areas (named LCAREA) 01, 02 and 08, are established. The parameters indicative of the running conditions of the vehicle, i..e, the detected throttle opening THHF and vehicle speed VLVH are used as address data for determining whether the operating condition falls in one of the three areas and, when it does, reference level or data selected for the area concerned is retrieved and lockup clutch failure is detected by comparing the detected torque converter slip ratio ETR with the retrieved data. The failure detection is made in accordance with the area LCAREA as follows:

Discrimination area 08

A final "normal" or "failure" judgment is made immediately based on the result of the comparison.

Discrimination area 01

A final "normal" judgment is made within a period based on the result of the comparison but a final "failure" judgment is not made.

Discrimination area 02

A final "normal" judgment is made within a period based on the result of the comparison but a final "failure" judgment is not made.

To be more specific, since the detection accuracy is not so good in the discrimination areas 01 and 02 where the engaging force is weak, a fourth area 04 is established, and when a provisional failure judgment is made in 01 or 02, the system waits until the operating state has moved from the discrimination area 01 to the area 04 and then makes a final failure (or normal) judgment based on a comparison between the reference data and the slip ratio ETR measured at the increased lockup system pressure after the pressure of the control linear solenoid SL5 has been set to maximum. More specifically, the slip ratio ETR at the time the torque converter slip has been reduced as far as possible, is compared with the reference data.

Figure 7:
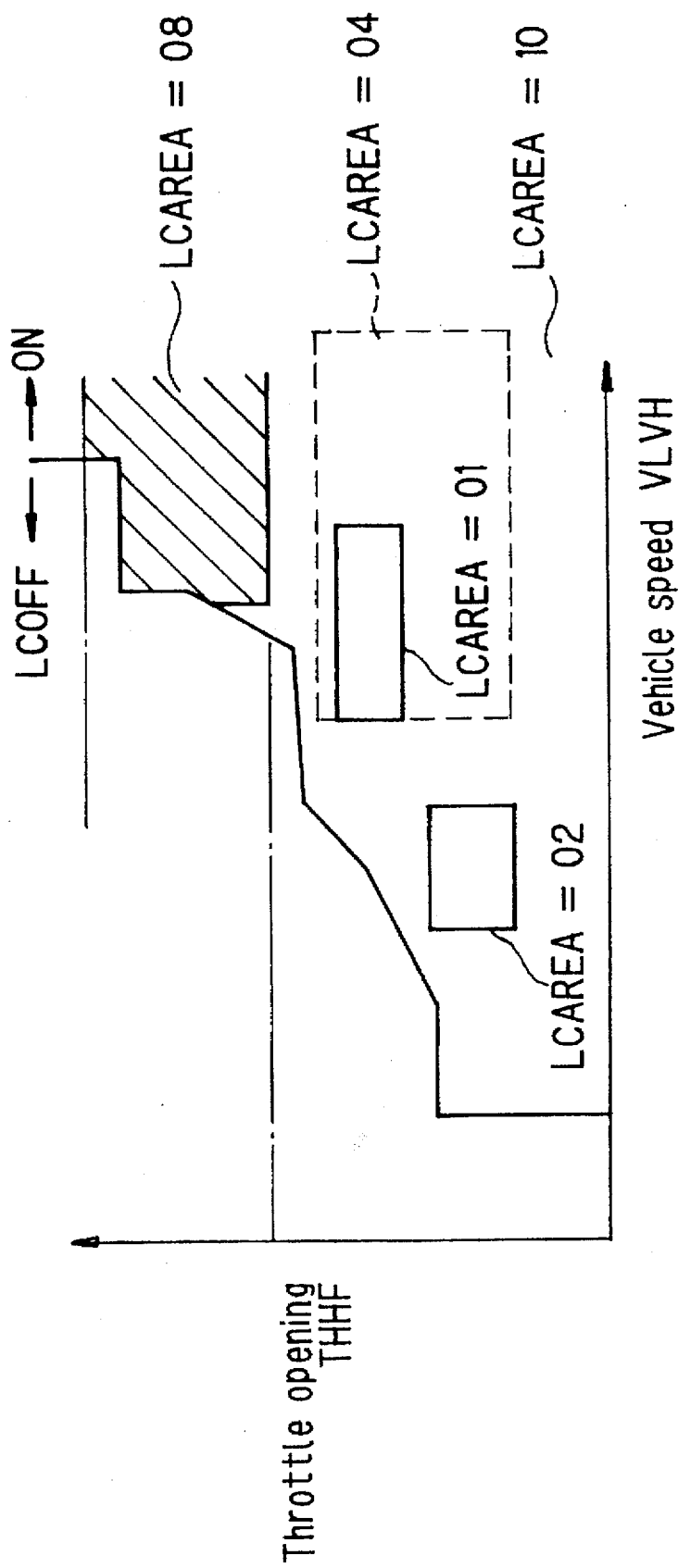
FIG. 7 is a graph, partially similar to FIG. 3, but showing operational areas to be used in the failure detection of FIG. 5.

As can be seen in FIG. 7, all of the four aforesaid areas LCAREA are lockup ON regions but differ in engaging force. Specifically, area 08 is a completely locked-up area, while the engaging force is lower in area 01 and lower yet in area 02. The areas 01, 02 and 08 are defined so as not to overlap, while the area 04 is defined to include the area 01. The lockup ON region outside these areas is designated 10. No failure detection is conducted in area 10.

While strictly speaking the torque converter slip ratio ETR is equal to turbine rotational speed/pump rotational speed, this embodiment uses the equivalent value of transmission input shaft speed NM/engine speed NE.

Based on the foregoing, the system will now be explained with reference to the subroutines of FIGS. 5 and 6.

The subroutine of FIG. 5 starts at S100 in which it is checked whether the detected vehicle speed VLVH is in the range of greater than a lower limit vehicle speed YVLCA8L defining the lower limit of the area 08 and not greater than an upper limit vehicle speed YVLCA8H defining the upper limit of the area 08. When it is, the program goes to S102 in which it is checked whether the detected throttle opening THHF is in the range of greater than a lower limit throttle opening YTHLCA8L defining another lower limit of the area 08 and not greater than an upper limit throttle opening YTHLCA8H defining another upper limit of the area 08. When it is, the program goes to S104 in which the discrimination area LCAREA is set to 08.

When the result is NO in S100 or S102, the program goes to S106 in which it is checked whether the bit of the flag F.LINMAX is 1. As explained later, the linear solenoid pressure is set to maximum when the bit of this flag is 1. Since the initial value of the flag bit is 0, however, the result in S106 is NO in the first program loop (control cycle) and the program proceeds appropriately through S108 to S114 in which the detected vehicle speed VLVH and throttle opening THHF are compared with the values defining the lower and upper limits of the other discrimination areas and, depending on the results of the comparisons, goes to S116 or S118 in which the discrimination area LCAREA is set to 01 or 02.

Figure 8:
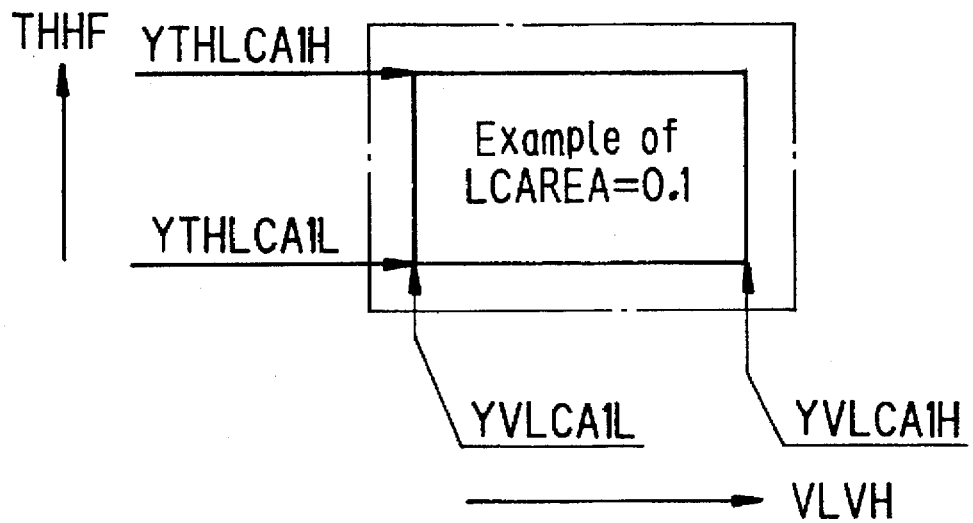
FIG. 8 is an explanatory view showing the limit values defining one of the operational area illustrated in FIG. 7.

FIG. 8 shows the lower limit throttle opening YTHLCA1L and the upper limit throttle opening YTHLCA1H defining the discrimination area 01. The upper limit value is not limited to that for the discrimination area 01 but is provided with a hysteresis area.

When the result is NO in S112 or S114, the program goes to S120 in which the discrimination area LCAREA is set to 10 (meaning that the operating condition falls outside the failure discrimination areas), and to S122 in which the bit of the flag F.LINMAX is reset to 0. When the program goes to one of S104, S116 and S118, it then proceeds to S124 in which the bit of the flag F.LINMAX is similarly reset to 0.

Next, in S126, a lower limit value YETLCJnL and a upper limit value YETLCJnH (n: LCAREA 01, 02, 04, 08) of the ETR data (the aforesaid reference level or data) for judging the torque converter slip ratio ETR are selected in accordance with the determined discrimination area LCAREA. Since, as explained earlier, the torque converter slip ratio differs depending on the discrimination area, the upper and lower limit values YETLCJnH, L are appropriately set between 95% and 102% (in braking effect of engine) of the torque converter slip ratio.

The program then proceeds to S128 in which it is checked whether the discrimination area LCAREA has changed. The result in S128 is NO in the first program loop (control cycle) and the program goes to S130 in which it is checked whether the discrimination area LCAREA is 01. If it is, the program goes to S132 in which it is checked whether the value of a timer TMHO (explained later) has reached 0. In the first program loop (control cycle) the result is NO and the program goes to S134 in the flowchart of FIG. 6 in which it is checked whether the detected torque converter slip ratio ETR is in the range of greater than the lower limit value YETLCJnL and not greater than the upper limit YETLCJnH (n: 01) of the earlier selected data for judging the torque converter slip ratio ETR in area 01, in other words, whether the torque converter slip ratio ETR is within the prescribed range.

When the result in S134 is YES, the program goes to S136 in which the failure detection timer TMLCF is set to the prescribed value YTMLCF and started, and to S138 in which it is checked whether the value of another timer TMLCMOT (earlier mentioned normal judgment timer; explained later) has reached 0. The result is of course NO this time and the program is terminated. Later, after a number of subsequent program loops (control cycles), when S138 finds that the timer value has reached 0, the lockup clutch is judged normal and the program goes to S140 in which the bit of the flag F.LCFUNCMOT is set to 1. This flag means that the normal/failure discrimination has been completed.

On the other hand, when S134 finds that the detected torque converter slip ratio ETR is not in the range of greater than the lower limit value YETLCJnL (n: discrimination area LCAREA) and not greater than the upper limit YETLCJnH of the selected reference data for the area, i.e., when the slip ratio is found not to be in the prescribed range, the program goes to S142 in which the normal judgment timer TMLCMOT is set to the prescribed value YTMLCMOT and measurement of time lapse is started, and to S144 in which it is checked whether the value of the failure detection timer TMLCF has reached 0. When it has not, it is concluded that detection is in progress and the program cycle is terminated.

Later, after a number of program loops (control cycles), when the result in S144 becomes YES, the program goes to S146 in which it is checked whether the discrimination area is 08. When it is, a lockup failure judgment is made immediately and the program goes to S148 in which the bit of the flag F.LCFUNCT is set to 1. When S146 finds that the discrimination area is not 08, the program goes to S150 in which it is checked whether the discrimination area is 04. When it is, lockup clutch failure is immediately confirmed and the program goes to S148, and when it is not, i.e., when it is found to be 01 or 02, lockup clutch failure is not confirmed and the program is terminated.

In this case, the program passes through the flowchart of FIG. 4 to S100 of the flowchart of FIG. 5. The program moves from S100 to S128, again determining the discrimination area LCAREA and checking whether it has changed. When S128 finds that the discrimination area has changed, the program goes to S152 in which it is checked whether the new discrimination area is 01. When it is, the program goes to S154 in which the timer TMHO is set to a prescribed value YTMHO and measurement of time lapse is started, to S156 in which the failure detection timer TMLCF and the normal judgment timer TMLCMOT are set to the prescribed values YTMLCF and YTMLCMOT, and then proceeds to S134 and the following steps of FIG. 6 for making a final failure or normal judgment.

In the next and following program loops (control cycles), when S128 finds that the discrimination area has not changed, the program goes through S130 to S132 in which it is checked whether the value of the timer TMHO has reached 0 and, when it has, to S158 in which the bit of the flag F.LINMAX is set to 1, to S156 in which the failure detection timer TMLCF and the normal judgment timer TMLCMOT are reset to the prescribed values and measurement of time lapse restarted, and to S134 and the following steps for making a final failure or normal judgment.

In the next and following loops (control cycles), when the result in S100 or S102 is NO, the program goes to S106 in which it is found that the bit of flag F.LINMAX is 1, to S160 and S162 in which it is checked whether the detected vehicle speed VLVH is in the range of greater than a lower limit vehicle speed YVLCA4L defining the area 04 and not greater than an upper limit vehicle speed YVLCA4H defining the area 04 and whether the detected throttle opening THHF is in the range of greater than a lower limit throttle opening YTHLCA4L defining the area 04 and not greater than an upper limit throttle opening YTHLCA4H defining the area 04, and, when the results are YES, to S164 in which the discrimination area is set to 04. Since, as mentioned earlier, the discrimination area 04 includes the discrimination area 01, the results in S160 and S162 should normally be YES.

Figure 9:
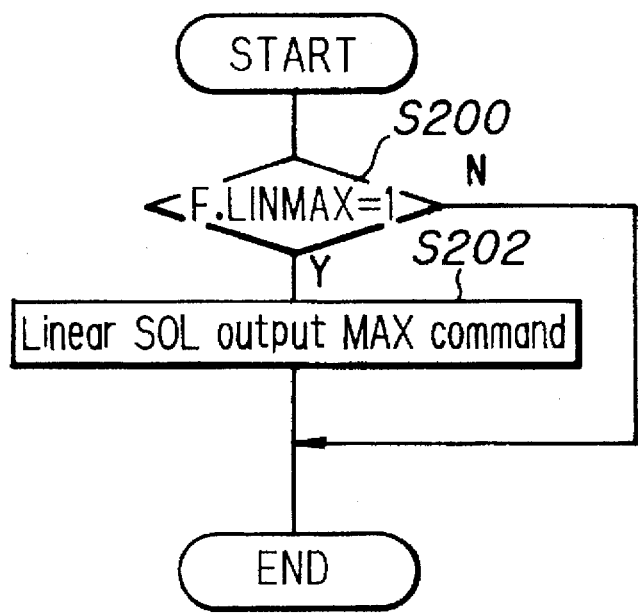
FIG. 9 is a flowchart showing a subroutine conducted in parallel with the subroutine flowchart of FIG. 5.

On the other hand, a constant check is made in S200 of the flowchart shown in FIG. 9 as to whether or not the bit of the flag F.LINMAX is 1, and, when it is found to be, the program goes to S202 in which a command is issued to set the oil pressure of the linear solenoid SL5 to maximum.

When the program thereafter proceeds to S134, therefore, the check in S134 as to whether the torque converter slip ratio is within the prescribed range of the discrimination area 04 is made in the complete locked-up state, namely, in the state in which the torque converter slip has been reduced as far as possible. When S134 finds that the slip ratio is not within the expected range, a failure judgment is made and the program passes through S142 and the following steps in which the failure judgment is made affirmative.

Thus, final failure judgments are not made immediately in the discrimination areas 01 and 02. Instead, the system waits until the operating state or condition has moved from the discrimination area 01 to the area 04 and then checks whether the slip ratio is in the prescribed range after the lockup engaging force has been increased by setting the pressure of the linear solenoid to maximum, namely, after the lockup clutch slip has been reduced as far as possible. As a result, failure of the lockup clutch can be accurately detected even when the amount of slip exceeds the desired value in the 01 and 02 areas where the engaging force is weak.

When the result in S134 is YES, moreover, a normal judgment is not made immediately but only after the discrimination has been continued for a prescribed period of time (until the normal judgment timer TMLCMOT times out). This increases the reliability of a judgment that the lockup clutch is operating normally. As will also be understood from the foregoing explanation, this prescribed period is reset when the discrimination area changes and, therefore, the discrimination can be continued with respect to the same discrimination area for the prescribed period and a normal judgment is made only after the torque converter slip ratio has remained in the prescribed region for the prescribed period.

In addition, since failure detection is possible even when the lockup clutch is being slip-controlled, the failure detection range can be enlarged and the need to set a broad discrimination region when a completely locked-up (fully-engaged) command is in effect is eliminated, whereby the failure detection accuracy is also improved in this sense.

When the result of S152 in the flowchart of FIG. 5 is NO, the program goes to S166 in which the value of the timer TMHO is reset to 0. The timer TMHO is arranged to begin clocking when the vehicle speed VLVH reaches 80 km/h or more, for example. The purpose of this is to avoid failure detection at low vehicle speed and low throttle opening when, as can be seen from FIGS. 3 and 7, the engaging force of the lockup clutch L is weak and to conduct detection only in regions where the engaging force is relatively high.

Returning to the flowchart of FIG. 4, the program next goes to S44 in which the throttle opening THLCF in the preceding program loop (control cycle) is rewritten to the throttle opening THHF detected in the current program loop (control cycle). This is for facilitating the computation in the next program loop. Further, if S10 finds that the solenoid SL3 or SL4 has failed, the program suspends the failure detection by going to S46 in which the bit of the failure flag F.LCFUNCT is set to 1, to S48 in which the bit of the flag F.LCFUNCMOT is set to 1, and to S50 in which the bit of the flag F.LINMAX is reset to 0, whereafter the program terminates.

The bit of the flag F.LCFUNCMOT is set to 1 in S48 for the same reason that it is set to 1 when the result in S12 or S16 is affirmative. In addition, the bit of this flag is also set to 1 when failure detection is terminated earlier at S140. Therefore, the bits of both flag F.LCFUNCT and flag F.LCFUNCMOT are invariably set to 1 when any failure is detected in the lockup clutch or elsewhere.

As described in the foregoing, this embodiment does not immediately make final failure judgments in the discrimination areas 01 and 02. Instead, it waits until the operating state has moved from the discrimination area 01 to the area 04 and then checks whether the slip ratio is in the prescribed range after the lockup clutch slip has been reduced as far as possible by setting the pressure of the linear solenoid to maximum. Lockup clutch failure can therefore be detected with complete reliability.

When the torque converter slip ratio is within the prescribed range, moreover, a "normal" judgment is not made immediately but only after the discrimination has been continued for a prescribed period. This make it possible to reliably detect that the lockup clutch is operating normally. The detection accuracy is therefore enhanced since a "normal" judgment can be avoided in a case where the lockup clutch operates normally through most of the prescribed period but exhibits slip right at the end.

On the other hand, when the operating condition is in discrimination area 08 or 04, when it is found even once during the prescribed period that the torque converter slip ratio is outside the prescribed range, a final failure judgment is made immediately upon passage of the prescribed period. The failure detection accuracy is therefore also improved. Further, since only provisional failure judgments are made in the discrimination areas 01 and 02 and the final judgment is made after the operating condition has moved to the discrimination area 04, reliable failure detection is ensured in the discrimination areas 01 and 02 in which the engaging force of the lockup clutch is weak and slip control is conducted.

In addition, since failure detection is thus possible even when the lockup clutch is being slip-controlled, the failure detection range can be enlarged and the need to set a broad discrimination region when a complete lockup command is in effect is eliminated, whereby the fail detection accuracy is also improved in this sense.

While the invention has been described taking a hydraulically operated transmission as an example, this is not limitative and the invention can also be applied to other types of automatic transmissions having a lockup clutch.

While the invention has thus been shown and described with reference to the specific embodiments, it should be noted that the invention is in no way limited to the details of the described arrangements, changes and modifications may be made without departing from the scope of the appended claims.

What is claimed is:

1. A system for discerning an operating state of a clutch mechanism of a vehicle that couples an output of an internal combustion engine mounted on the vehicle and an input of a transmission connected to the engine, said system comprising:

input rotational speed detecting means for detecting a rotational speed of a shaft input to the clutch mechanism;

output rotational speed detecting means for detecting a rotational speed of a shaft output from the clutch mechanism;

engaging force command generating means for generating an engaging force command to be applied to the clutch mechanism such that the clutch mechanism is in one of a plurality of engaged conditions ranging from a fully-engaged condition to a disengaged condition including a slip-engaged condition; and clutch mechanism operation determining means for determining whether the clutch mechanism operation is normal, by comparing a difference between the rotational speed detected by said input and output rotational speed detecting means with a reference value indicative of the engaging force command and for outputting a result of the comparison, wherein said clutch mechanism operation determining means including reference value changing means for changing said reference value indicative of said engaging force command in response to the result of the comparison and repeating means for repeating said determining when said clutch mechanism operation is determined not to be normal.

2. A system according to claim 1, wherein said clutch mechanism is a lockup clutch of a torque converter.

3. A system for discerning an operating state of a clutch mechanism of a vehicle that couples an output of an internal combustion engine mounted on the vehicle and an input of a transmission connected to an engine, said system comprising:

input rotational speed detecting means for detecting rotational speed of a shaft input to the clutch mechanism;

output rotational speed detecting means for detecting a rotational speed of a shaft output from the clutch mechanism;

engaging force command generating means for generating an engaging force command to be applied to the clutch mechanism such that the clutch mechanism is in one of a plurality of engaged conditions ranging from a fully-engaged condition to a disengaged condition including a slip-engaged condition; and clutch mechanism operation determining means for determining whether the clutch mechanism operation is normal, by comparing a difference between the rotational speed detected by said input and output rotational speed detecting means with a reference value indicative of the engaging force command and for outputting a result of the comparison, wherein said clutch mechanism operation determining means including an engaging for command changing means for changing the engaging force command in response to the output of the comparison and repeating said determining when said clutch mechanism operation is determined not to be normal.

4. A system according to claim 1 or 3 wherein said clutch mechanism operation determining means conducts said determination in a pre-set limited operation area and enlarges said operation area and repeats said determination, without outputting said pre-set limited operation area determining result, when said clutch mechanism operation is determined not to be normal.

5. A system according to claim 4, wherein said clutch mechanism operation determining means increases the engaging force of the clutch mechanism in the enlarged operation area when repeating said determining.

6. A system according to claim 5, wherein said clutch mechanism operation determining means outputs the results of said determination whether said clutch operation is normal after the engaging force of the clutch mechanism has been increased.

7. A system according to claim 1 or 3, wherein said clutch mechanism operation determinating means conducts said determining in a pre-set limited operation area and enlarges said operation area and repeats said determination without outputting said pre-set limited area determining result, when said clutch mechanism operation is unable to be determined.

8. A system according to claim 7, wherein said clutch mechanism operation determinating means increases the engaging force of the clutch mechanism in the enlarged operation area when repeating said determinating.

9. A system according to claim 8, wherein said clutch mechanism operation determinating means outputs the results of said determination whether said clutch mechanism operation is normal after the engaging force of the clutch mechanism has been increased.

10. A system according to claim 1 or 3, wherein said clutch mechanism determining means outputs the result of said determination whether said clutch operation is normal after having continually determined said clutch mechanism operation for a period that the clutch mechanism operation is normal.

11. A method of discerning an operation state of a clutch mechanism of a vehicle that couples an output of an internal combustion engine mounted on the vehicle and an input of a transmission connected to the engine, said method comprising the steps of:

detecting a rotational speed of a shaft input to the clutch mechanism;

detecting a rotational speed of a shaft output from the clutch mechanism;

generating an engaging force command to be applied to the clutch mechanism such that the clutch mechanism is in one of a plurality of engaged conditions ranging from a fully engaged condition to a disengaged condition including a slip-engaged condition;

determining whether the clutch mechanism operation is normal, by comparing a difference between the rotational speeds detected by said input and output rotational speed detecting means with a reference value indicative of the engaging force command, and for outputting a result of the comparison; and changing said reference value indicative of said engaging force in response to the result of the comparison and repeating said determining when said clutch mechanism operation is determined not to be normal.

* * * * *